(12) United States Patent
Kano et al.

(10) Patent No.: US 7,222,194 B2
(45) Date of Patent: May 22, 2007

(54) BACKUP SYSTEM

(75) Inventors: Yoshiki Kano, Yokohama (JP); Naoto Matsunami, Hayama (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 766 days.

(21) Appl. No.: 10/198,913

(22) Filed: Jul. 19, 2002

(65) Prior Publication Data

US 2003/0135650 A1 Jul. 17, 2003

(30) Foreign Application Priority Data

Dec. 26, 2001 (JP) ............................. 2001-393054

(51) Int. Cl.
*G06F 15/16* (2006.01)

(52) U.S. Cl. ..................... 709/248; 709/223; 709/224; 709/225; 707/201; 707/204

(58) Field of Classification Search ................ 709/248, 709/223–225; 707/201, 204
See application file for complete search history.

(56) References Cited

U.S. PATENT DOCUMENTS 6,804,690 B1 * 10/2004 Dysert et al. ............... 707/204
2003/0005120 A1 * 1/2003 Mutalik et al. ............. 709/225

* cited by examiner

*Primary Examiner*—Yves Dalencourt
(74) *Attorney, Agent, or Firm*—Townsend and Townsend and Crew LLP

(57) ABSTRACT

A backup method for a system including a network attached storage including a primary volume and a secondary volume, and a backup server connected to the network. The network attached storage performs a resynchronization process when a backup request is received at a time point that consistency of a file system can be guaranteed, the resynchronization process making the contents of the primary and secondary volumes coincide with each other, splits the secondary volume from the primary volume and transfers data of the secondary volume to the backup server while an online operation with the primary volume continues. The backup server stores the transferred data in a recording medium. The network attached storage performs again the resynchronization process for making the contents of the primary and secondary volumes coincide with each other, after backup completion.

10 Claims, 19 Drawing Sheets

BACKUP SYSTEM

BACKGROUND OF THE INVENTION

The present invention relates to a backup system for files in a network attached storage.

A magnetic disc storage apparatus stores data obtained by a computer. In order to protect the data from accident, disaster and fault, the computer transfers the data to a magnetic tape apparatus. Such a data protection procedure is generally called "backup". In general backup, an operator manually designates a backup source device and a backup destination apparatus (such as a tape drive and a tape library apparatus) to initiate a backup process at a predetermined time and copy data to a backup device such as a magnetic tape.

A recent trend of interconnecting a plurality of host computers and storage devices to form a network is prevailing. This network is generally called a storage area network (SAN) in contrast with a local area network (LAN) such as Ethernet interconnecting a plurality of computers.

Computers and storage devices on SAN are interconnected by transmission paths such as copper cables and optical cables generally called Fibre Channel. The main advantage of SAN is provision of the environment that a plurality of computers can access each storage device in common. For example, data of a plurality of computers can be backed up in a single backup device because this backup device can be shared by the computers. In a system configuration having a number of computers and magnetic disc storage apparatuses, a tape library apparatus and a high speed tape apparatus are often used as a backup apparatus. In such a system, since the backup apparatus can be shared by a plurality of host computers, cost of the system configuration can be reduced.

With the advent of SAN, the number of environments which share a backup apparatus is increasing. A network attached storage (NAS) has therein a unique file system. This file system refers directly to a volume to back up data in the unit of volume, and data backup in the unit of file is impossible. For high speed on-line backup, it is necessary to connect a storage to a high speed I/O bus such as those in SAN and the like.

SUMMARY OF THE INVENTION

It is an object of the present invention to provide a backup system and a backup method of connecting a file in a unique file system of NAS to an I/O bus such as SAN and backing up data in the unit of file by a backup server connected to SAN.

The present invention provides a backup method for a system including a network attached storage including a primary volume and a secondary volume, and a backup server connected to the network. The network attached storage performs a resynchronization process when a backup request is received at a time point that consistency of a file system can be guaranteed, the resynchronization process making the contents of the primary and secondary volumes coincide with each other, splits the secondary volume from the primary volume and transfers data of the secondary volume to the backup server while an on-line operation by the primary volume continues. The backup server stores the transferred data in a recording medium. The network attached storage performs again the resynchronization process for making the contents of the primary and secondary volumes coincide with each other, after backup completion.

Other objects, features and advantages of the invention will become apparent from the following description of the embodiments of the invention taken in conjunction with the accompanying drawings.

DETAILED DESCRIPTION OF THE EMBODIMENTS

1. First Embodiment (1) Structure

Figure 1:
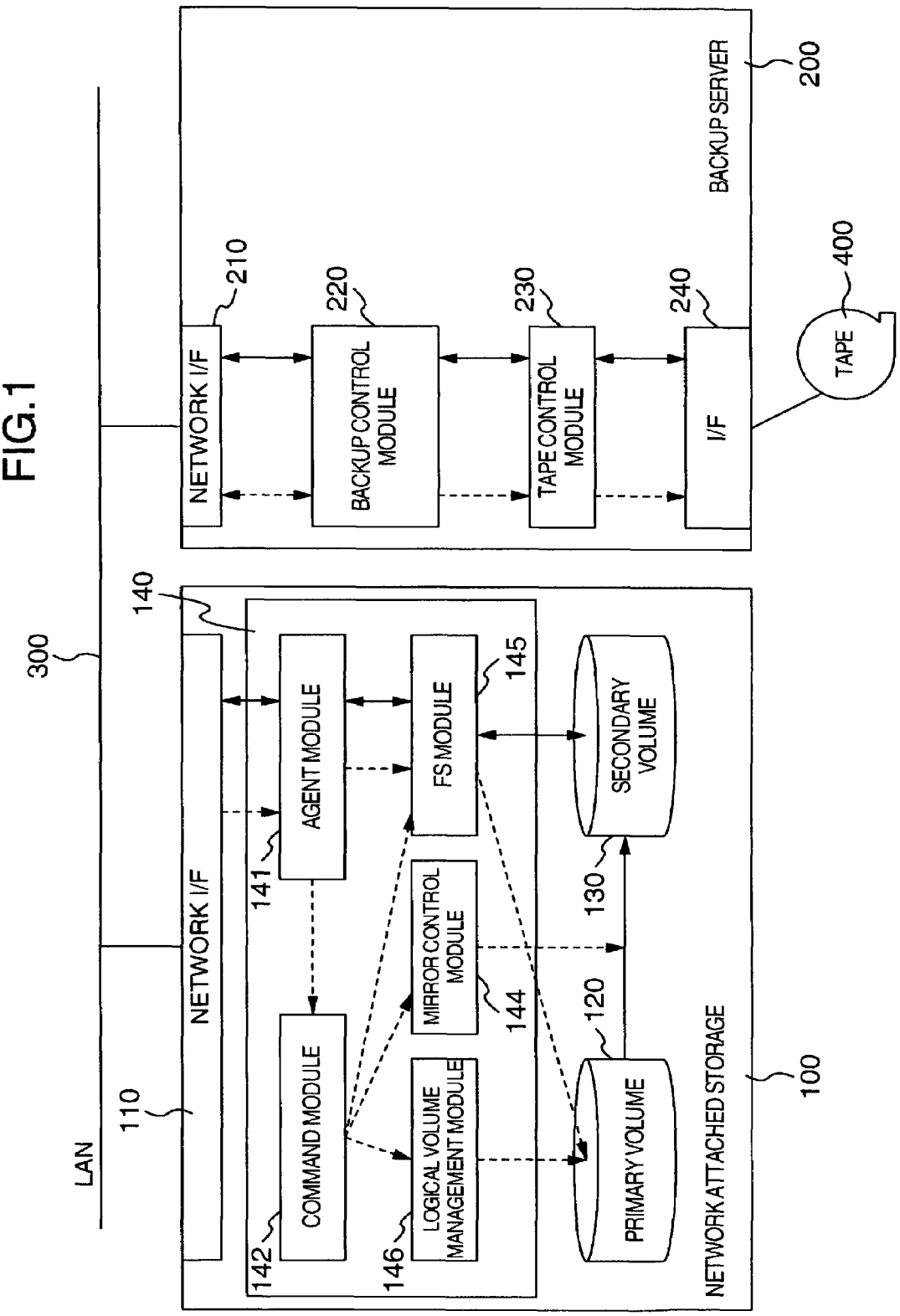
FIG. 1 is a diagram showing the structure of a computer system according to a first embodiment of the invention.

FIG. 1 shows an example of the structure of a backup system according to the first embodiment of the invention. The backup system is constituted of a network attached storage (NAS) 100 and a backup server 200 which are connected to a LAN 300. In this embodiment, although one NAS 100 and one backup server 200 are used, a plurality of NAS's and servers may be used.

One or a plurality of computers are connected to LAN 300 and access NAS 100 via LAN 300.

In this embodiment, although Gigabit Ethernet is used as LAN 300, other networks such as 100 BaseT, ATM and FDDI may also be used.

NAS 100 is constituted of: a network interface (I/F) 110 for connection to LAN 300; a primary volume 120 for storing user data; a secondary volume 130 to be used for backup and restore to be described later; and a controller 140 for controlling NAS 100. NAS 100 has also a CPU, a memory, an OS for controlling the whole of NAS 100, and a network file protocol such as NFS and CIFS and the like for accessing a file in the file system.

Figure 18:
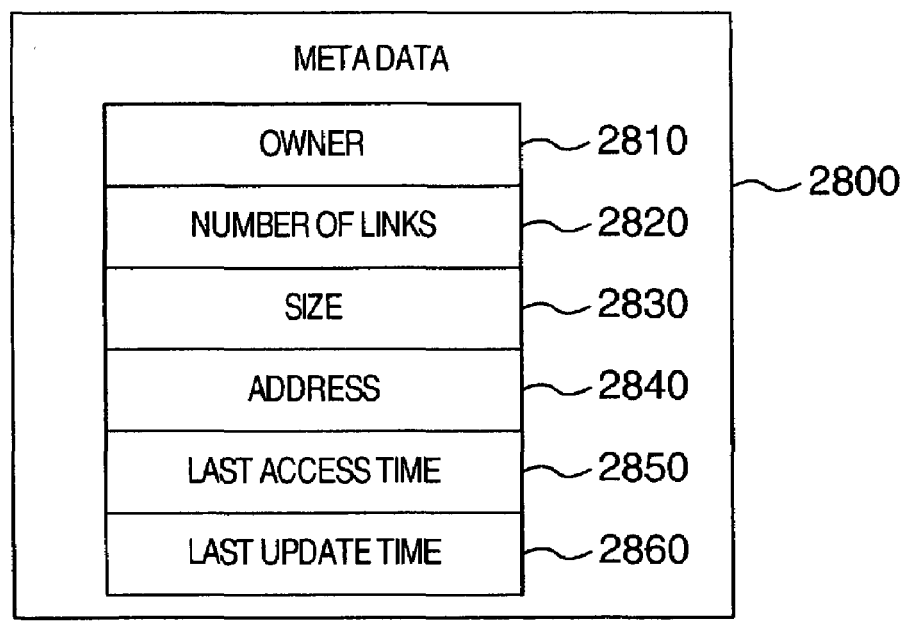
FIG. 18 is a diagram showing the structure of meta data according to an embodiment of the invention.

The controller 140 has: an agent module 141 which is controlled by the backup server 200; a command module 142 for performing processes of guaranteeing consistency of the file system and safely copying a volume; a logical volume management module 143 for managing the logical volume structure of a primary volume 120 and a secondary volume 130; a mirror control module 144 for controlling copy between the primary volume 120 and secondary volume 130; and a file system (FS) module 145 to be used for easily and speedily storing a user file. The FS module 145 is provided with a function of guaranteeing consistency of meta data representative of file information of the file system. The example of meta data is shown in FIG. 18.

The agent module 141, command module 142, logical volume management module 143 and FS module 145 are realized by software programs. The mirror control module 144 is realized by hardware and software programs.

The backup server 200 is constituted of: an network interface (I/F) 210 for connection to LAN 300; a backup control module 220 for controlling backup of a file in NAS 100; a tape control module 230 for controlling the operation of a tape apparatus; and an input/output interface (I/F) 240 for connection to the tape apparatus 400. In this embodiment, although the input/output I/F 240 for connection between the tape apparatus 400 and backup server 200 uses Fibre Channel, other interfaces such as SCSI and RS232C may be used which can connect and control a tape apparatus to transfer data.

The backup server 200 also has a CPU, a memory and an OS for controlling the whole of the backup server.

In FIG. 1, an arrow with a solid line shaft indicates the flow of data, and an arrow with a broken line shaft indicates the flow of control. The tape apparatus 400 is connected to the backup server 200 via the input/output I/F 240. In this embodiment, although a single tape apparatus is used, a tape silo may be used.

(2) Normal Operation

In a normal operation, a computer connected to LAN accesses the network attached storage (NAS) 100. Data is written in the primary volume 120 and read therefrom. In NAS 100, a copy of the primary volume 120 is created in the secondary volume 130 in order to improve reliability. The mirror control module 144 creates this copy. The following typical copy creating methods are known.

(A) Each time data is written in the primary volume, the mirror control module 144 writes the same data in the secondary volume.

(B) Data write (update difference) in the primary volume is recorded and the mirror control module 144 periodically reflects the recorded update difference upon the secondary volume. Typically, a bit map having each bit corresponding to each block of the primary volume is prepared, and the bit corresponding to the data written block is turned ON. The mirror control module periodically copies a block or blocks corresponding to the ON bit or bits from the primary volume to the secondary volume. After this copy, the mirror control module turns OFF all bits of the bit map. An operation of making the contents of the primary and secondary volumes coincide with each other is called resynchronization.

In the description of this embodiment, the method (B) is adopted.

(3) Backup and Restore

The outline of backup and restore will be described.

(3–1) Backup (a) Upon reception of a backup request, NAS makes the contents of the primary and secondary volumes coincide with each other in the status which can ensure consistency of files.

(b) NAS splits the secondary volume and continues an on-line operation of the primary volume, i.e., an access via LAN.

(c) NAS transfers requested backup data from the split secondary volume to the backup server. The backup server records the transferred data on a tape.

(d) After completion of backup, the secondary volume is linked to the primary volume and the contents of the primary and secondary volumes are made coincident (resynchronized) to thereafter perform the normal operation.

(3–2) Restore (a) Upon reception of a restore request, NAS splits the secondary volume from the primary volume to use the secondary volume as a restore operation dedicated volume (restore volume) and continue the online operation with the primary volume.

(b) The backup server reads data from the tape and transfers it to the restore volume in NAS.

(c) The user acquires the data from the restore volume.

(d) NAS links the restore volume to the primary volume to recover the secondary volume, copies the contents of the primary volume to the secondary volume to thereafter continue the normal operation.

The details of backup and restore will be described.

A user (or system administrator) enters from an input device of the backup server 200 a command for designating backup or restore and a parameter for identifying a volume name or a directory name and/or a file name of a subject to be backed up or restored. These command and parameter may be entered from a computer or NAS connected to LAN and sent to the backup server 200 via LAN.

Figure 2:
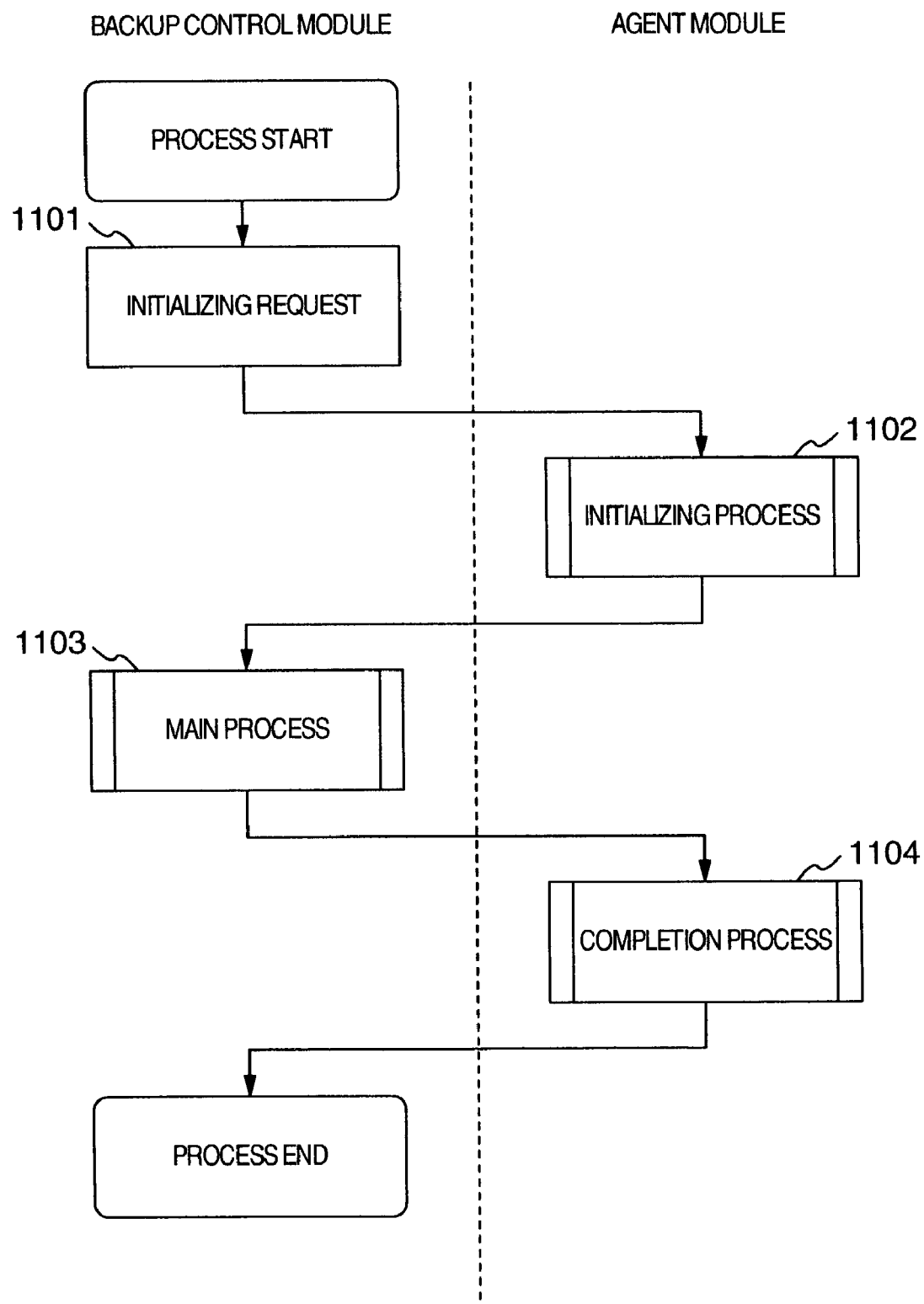
FIG. 2 is a flow chart illustrating processes to be executed by a backup control module 220 and an agent module 141 according to the first embodiment.

When a command is entered, the backup control module 220 of the backup server 200 starts the processes shown in FIG. 2.

The backup control module 220 requests the agent module 141 of NAS 100 containing volume/directory/file to be backed up/restored to execute an initializing process to be described later (1101).

In response to the request from the backup control module 220, the agent module 141 executes the initializing process to be described later (1102). In this initializing process, a copy of the file system is created in the secondary volume 130 for the backup of the primary volume 110 in the state that consistency of the file system is guaranteed, and the secondary volume 130 with a new file system to be used for the restore is provided. After the initializing process, the backup control module 220 performs a real backup or restore as the main process to be described later (1103). After the main process, the agent module 141 executes a completion process such as unmounting the used secondary volume 130 (1104).

For creating a copy from the primary volume 120 into the secondary volume 130, NAS 100 is provided with a function of applying the update difference of the primary volume 120 to the secondary volume 130 in order to create the copy quickly and in a short time. In order to positively utilize this function, it is necessary to make the contents of the primary volume 120 and secondary volume 130 coincide with each other by using in advance a such copy of the volume. This state of NAS 100 is called an initial state.

Figure 3:
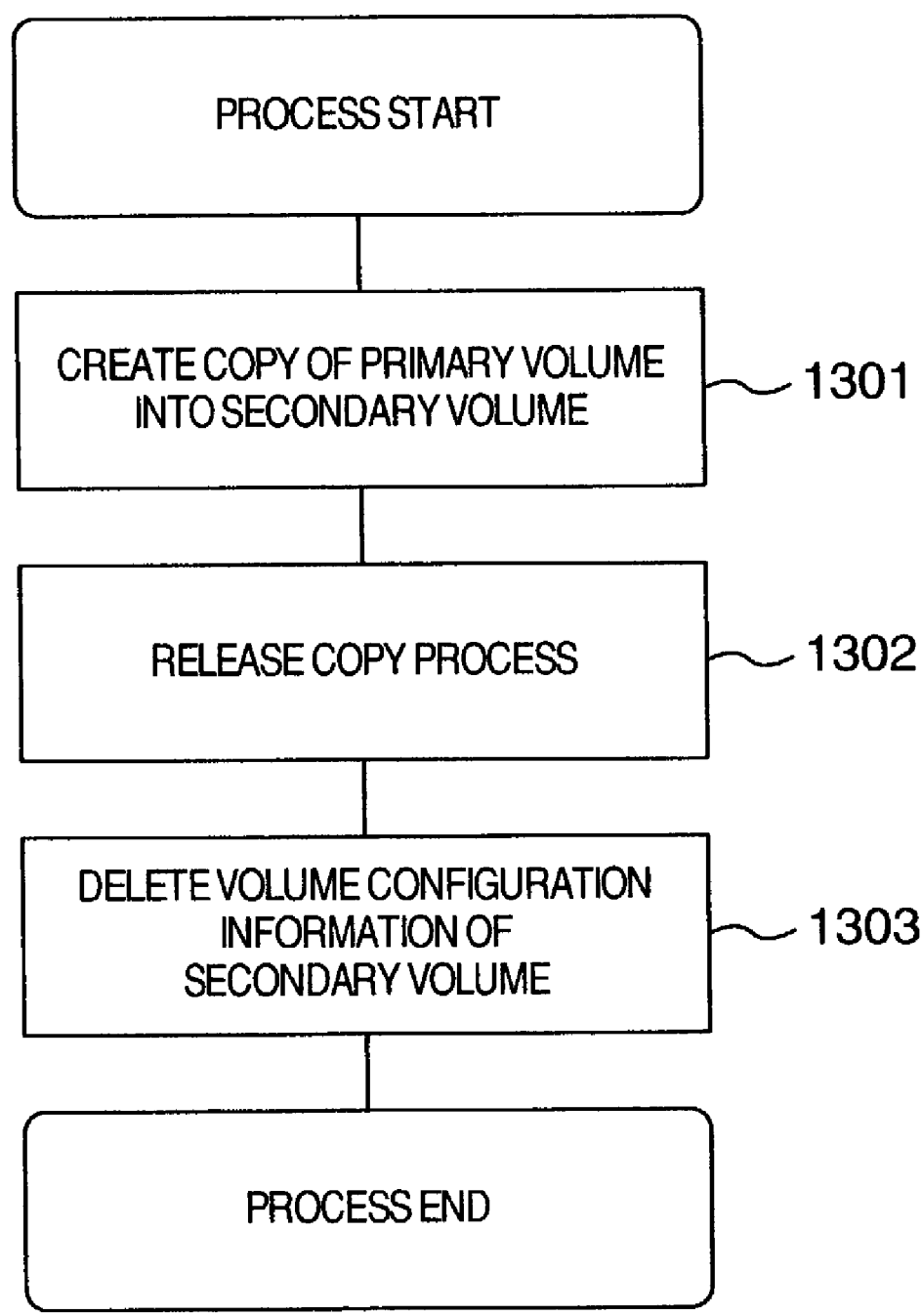
FIG. 3 is a flow chart illustrating processes to be executed by a mirror control module 144 according to the first embodiment.

FIG. 3 is a flow chart illustrating a process of setting an initial state to be executed by the mirror control module 144. This process is executed when the power of NAS 100 is turned on or it is restarted. This process will be described with reference to FIG. 3. A copy of the primary volume 120 is created in the secondary volume 130 (1301). After the copy is created, this copy process is released (1302). Volume configuration information of the secondary volume 130 is deleted (1303).

Figure 17:
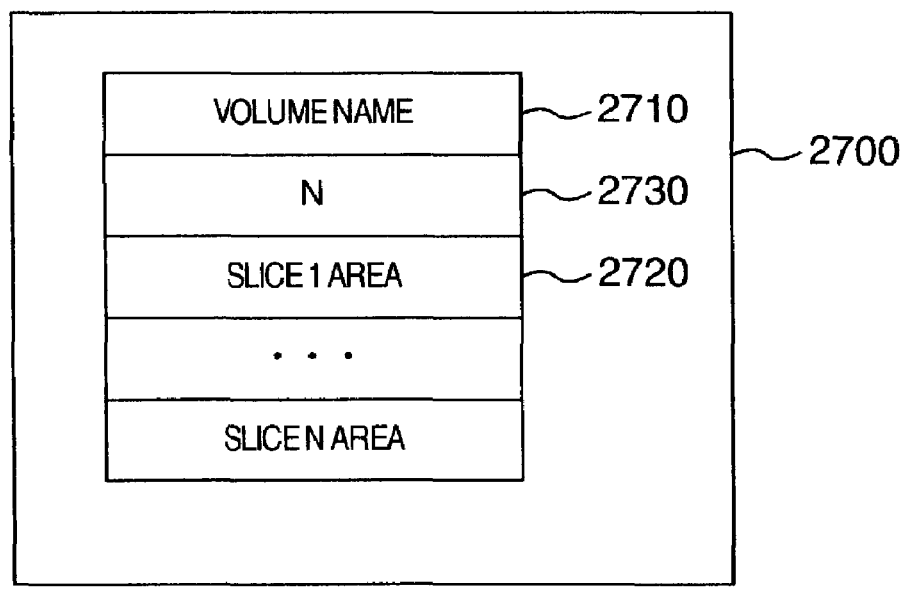
FIG. 17 is a diagram showing the structure of a volume label according to an embodiment of the invention.

As shown in FIG. 17, the volume configuration information 2700 is constituted of: a volume name 2710 which is used by a host when the host accesses the volume; a range 2730 of n slices describing the volume configuration information; and slice configuration information 2720 in the volume. This volume configuration information is recorded in several blocks from the top of the volume as a volume label. Since the volume name 2710 is unique in the system, it may be a unique number determined by the logical volume management system 146 of this backup system.

Each area of the slice configuration information 2720 stores its start address and end address. For example, in a volume having 1000 blocks, if two slices each having 500 blocks are partitioned, the slice I has a start logical block address (LBA) 0 as the start address and an end LBA 499 as the end address, and the slice II has the start LBA 500 and end LBA 999. The logical volume control module 146 can recognize this slice to create a volume for each slice. Logical volume management regarding a plurality of volumes as a single volume may be incorporated in this system.

Deleting the volume configuration information of the secondary volume at Step 1303 shown in FIG. 3 results from the following reason. If a copy of the volume with the volume label is created, NAS 100 can not distinguish between the primary volume 120 and secondary volume 130. In order to avoid this, the volume label is deleted beforehand.

The representative operation shown in FIG. 2 includes the initializing process 1102, main process 1103 and completion process 1104. Specific operations of these three processes will be described. First, the initializing process 1102 will be described with reference to FIG. 4. The agent module 141 receives an initializing process start request from the backup control module 220. At this time, a backup or restore command is affixed to the request. The command module 142 activates a script to be described later (1401). A script is a text describing the operation procedure. The command module 142 judges the operation of the script (1402). If it is judged as an error, this error is returned to the agent module 141 to stop the process (1403). The logical volume management module 146 recognizes the secondary volume 130 with a changed volume name 2710 (1404), and the FS module 145 confirms the contents of the file system and thereafter mounts the secondary volume 130 (1405) to terminate the initializing process.

An operation of script activation (1401) will be described with reference to FIG. 5. The script designates either a backup operation or a restore operation. The logical volume management module 146 judges the designated operation (1501). If the designated operation is the backup operation, a snapshot volume to be described later is created (1502). If the operation is the restore operation, a restore volume to be described later is created (1503). It is judged whether the operation is normally completed (1504). If it is judged as an error, the error is returned to stop the process (1505). If it is judged as a normal completion, the process is terminated.

An operation of snapshot creation (1502) will be described with reference to FIG. 6. Creating a snapshot is to create a copy of the volume in the state that consistency of the file system is ensured. First, the logical volume management module 146 checks the logical volume configuration information of the primary volume 120 (1601). The volume configuration information is written in the volume label 2700 in several blocks from the top of the volume. After the volume configuration is checked, the FS module 145 temporarily stops the file operation for files in the file system (1602). In this process, the FS module 145 writes information of stored files and data into the primary volume 120 for the high speed access in the file system, and sets a bit in order to indicate that the file is unmounted and to ensure consistency of the file system.

Next, the mirror control module 144 applies a update difference to the secondary volume 130 in order to create a copy of the primary volume 120 in the secondary volume 130 (1603). After the resynchronization, the secondary volume 130 is split to be used as a discrete volume (1604). The FS module 145 resumes the temporarily stopped file operation for the file system (1605). The logical volume management module 146 changes the volume name 2710 in the volume label 2700 in order to register the secondary volume 130 as another volume (1606). For example, a volume name PVOL is changed to a volume name SVOL. With this process, the volume name 2710 in the volume label 2700 is rewritten to thereafter complete the snapshot creation. The FS module 145 can therefore access the secondary volume independently from the primary volume.

Figure 7:
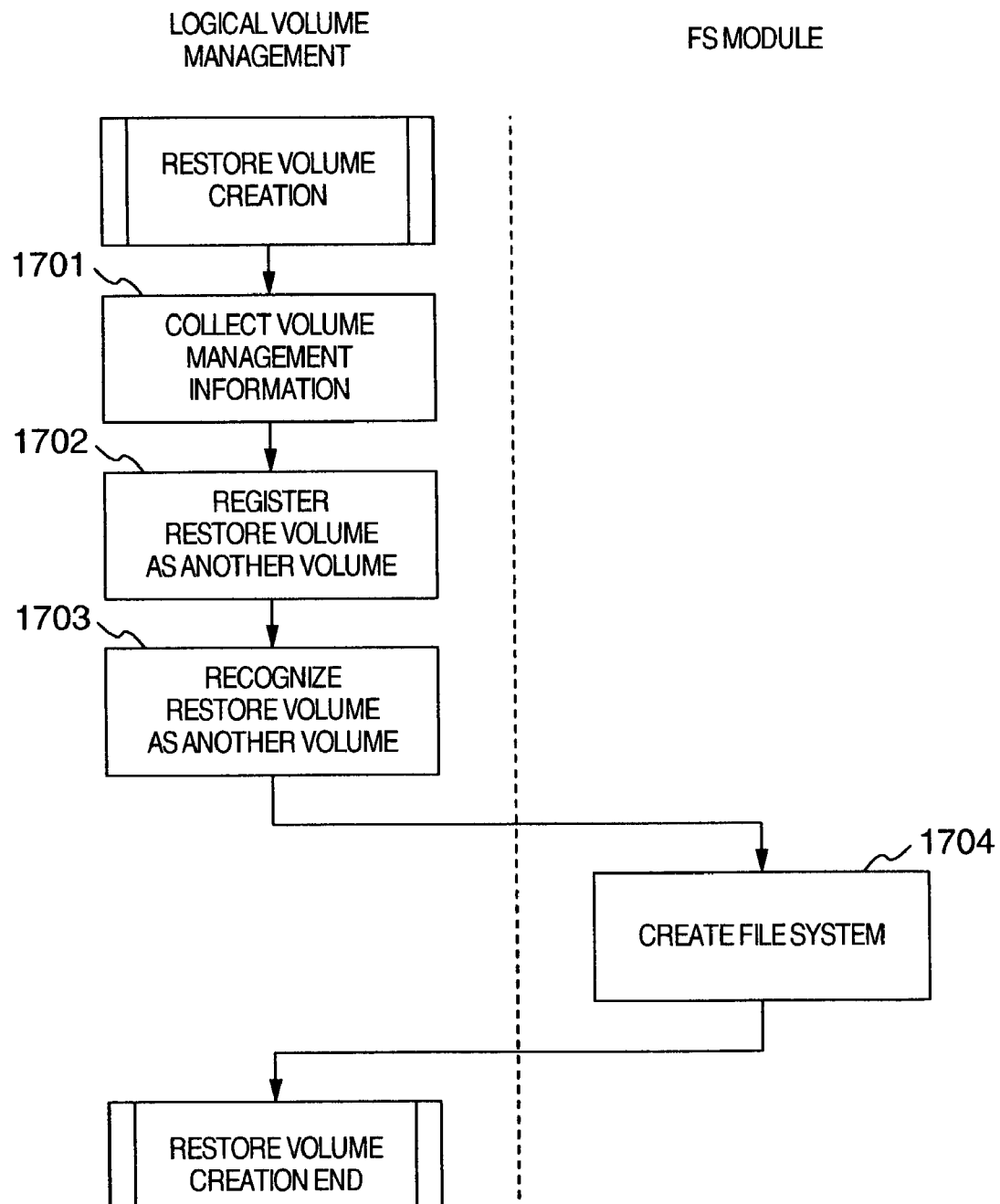
FIG. 7 is a flow chart illustrating processes to be executed by the logical volume management module 146 and FS module 145 during a restore volume forming process.

Next, creating a restore volume (1503) will be described with reference to FIG. 7. The logical volume management module 146 collects the logical volume configuration information of the primary volume 120 in order to create a restore volume having an equivalent configuration to that of the primary volume 120 in the secondary volume 130 (1701). In order to register the secondary volume as the restore volume, the logical volume configuration information is directly written in the volume label 2700 of the secondary volume and only the volume name 2710 is changed (1702). For example, the volume label 2700 of the primary volume 120 is copied on the secondary volume and the volume name 2710 of the secondary volume 130 is changed to SVOL. The logical volume management module 146 reconfigures the secondary volume 130 in accordance with the volume label and recognizes it as another volume (1703). The FS module 145 reconfigures the file system for restore (1704). With this process, restore volume creation is terminated.

Figure 10:
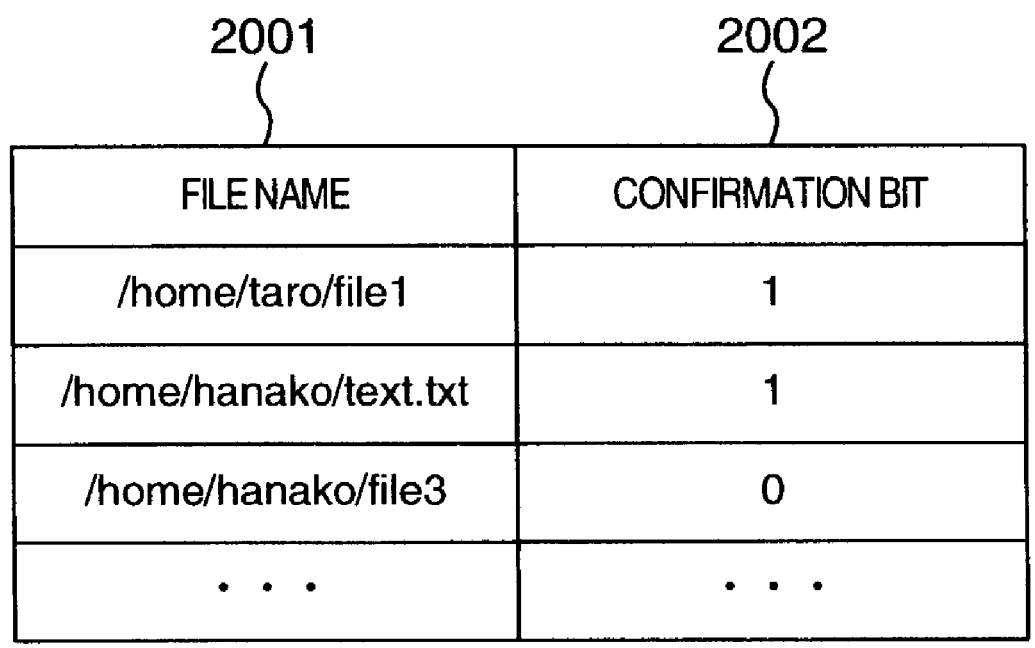
FIG. 10 is a diagram showing a file list according to an embodiment of the invention.

The main process 1103 will be described. The main process is different between backup and restore. First, the main process for backup will be described with reference to FIG. 8. The backup control module 220 of the backup server 200 requests to NAS 100 a list of files to be backed up (1801). The agent module 141 of NAS 100 returns a file list 200 mounted in the secondary volume, the file list having the format shown in FIG. 10 (1802). The file list 2000 has pairs of a file name 2001 and a confirmation bit 2002. A confirmation bit "1" indicates "already backed up" and a confirmation bit "0" indicates "still not backed up".

Figure 8:
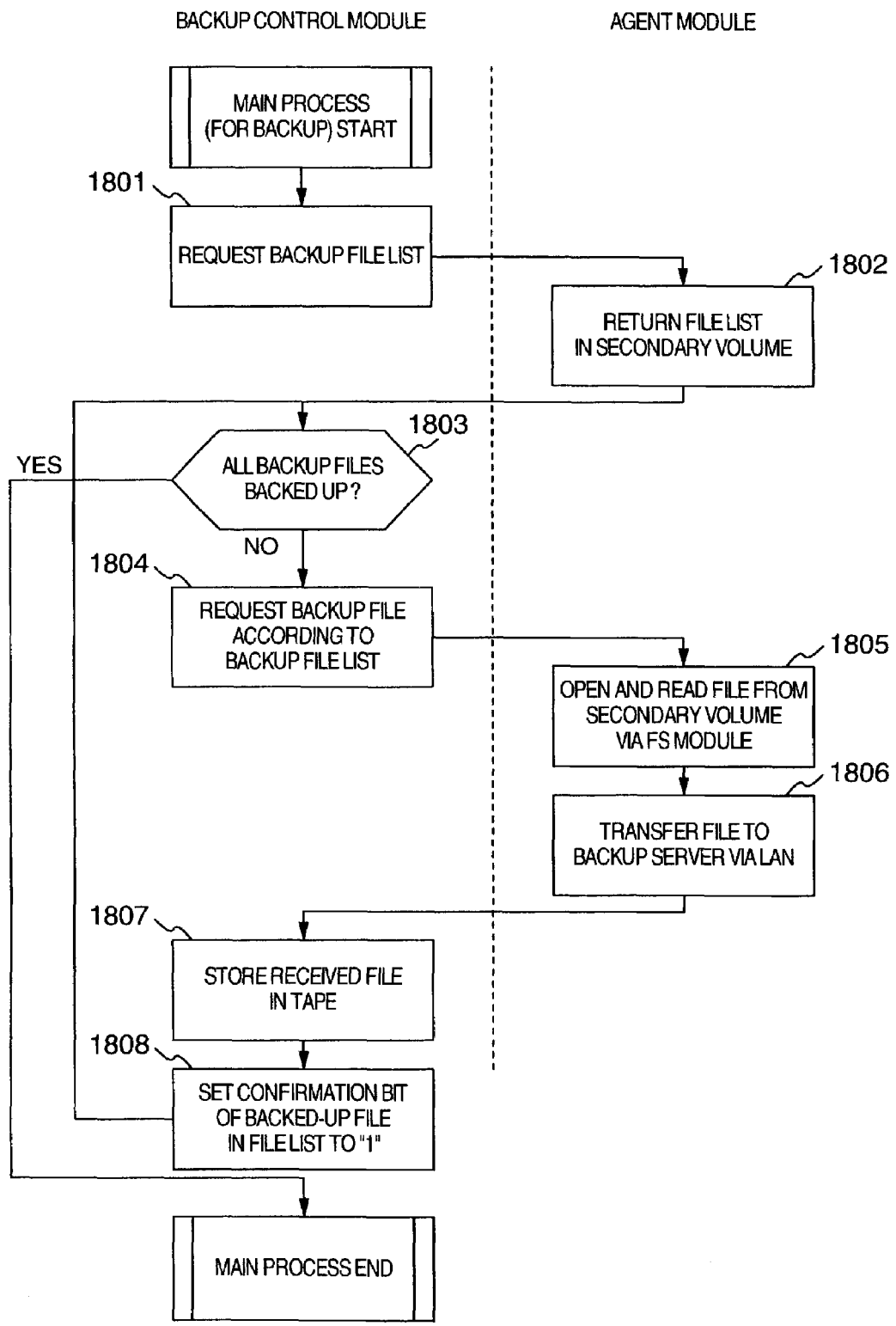
FIG. 8 is a flow chart illustrating processes to be executed by the backup control module 220 and agent module 141 during a backup process of a main process.

Reverting to FIG. 8, the backup control module 220 of the backup server 200 judges from the returned file list 2000 whether all backup files have already been backed up. The confirmation bit 2002 in the file list 2000 is referred to and if there is a file still not backed up, the backup control module 220 requests the file to the agent module 141 (1804). The agent module 141 reads in the file unit the subject file to the secondary volume 130 via the FS module 146 (1805). The agent module 141 transfers the file to the backup server 200 via LAN 300 (1806).

The backup control module 220 stores the received file in a tape via the tape control module 230 (1807). The backup control module 220 sets the confirmation bit 2002 of the file list 2000 corresponding to the file stored in the tape to "1" indicating "already backed up" (1808). Steps 1803 to 1808 are repeated until all files are backed up, i.e., until all the confirmation bits 2002 of the file list 2000 are set to "1", when the judgement at Step 1803 confirms the process end and the main process is terminated.

Figure 9:
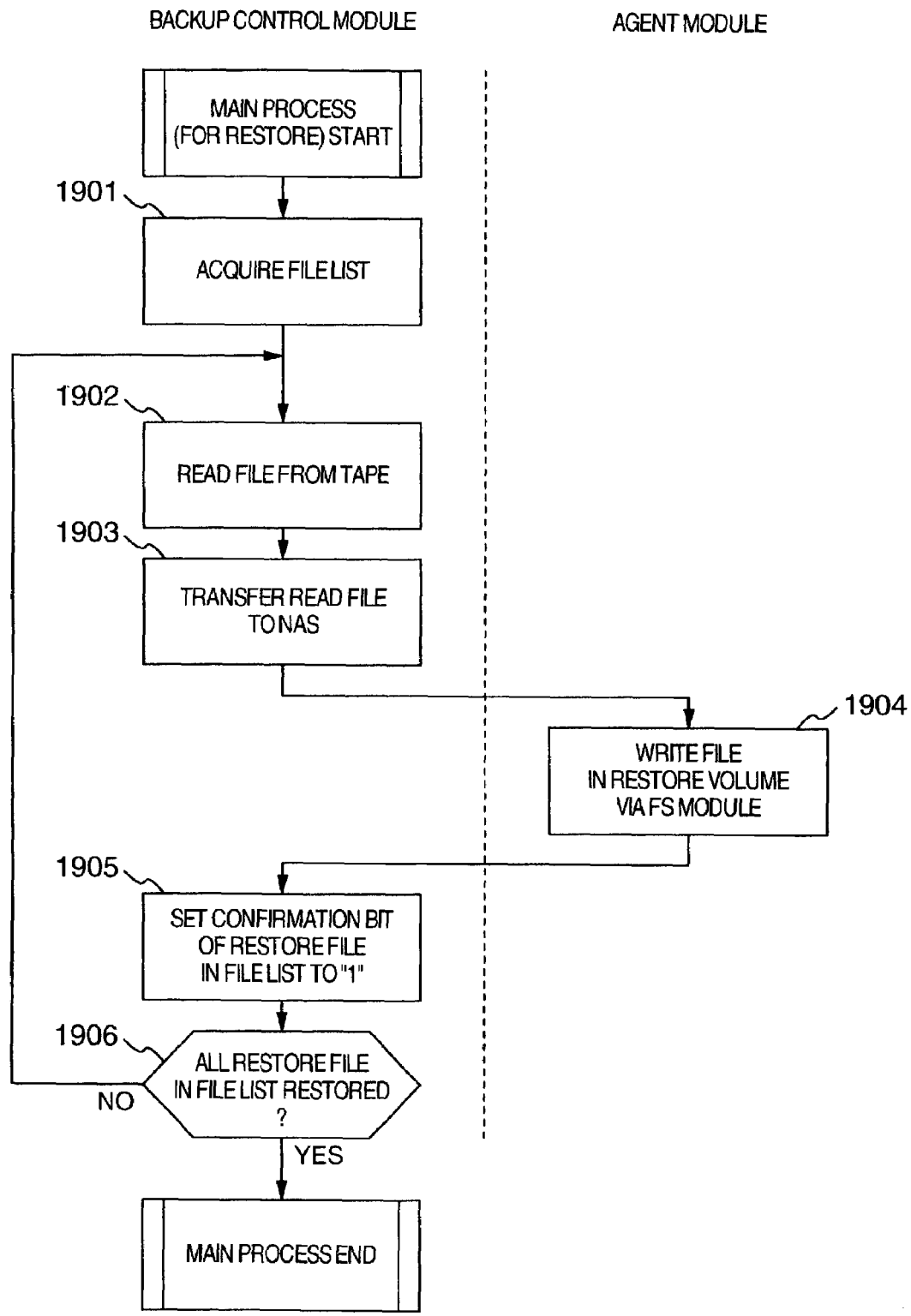
FIG. 9 is a flow chart illustrating processes to be executed by the backup control module 220 and agent module 141 during a restore process of the main process.

Next, the main process for restore will be described with reference to FIG. 9. First, the backup control module 220 of the backup server reads a file list stored in the tape apparatus 400 (1901). If the file list is stored in advance in the backup server 200, this file list may be used. The format of the file list is similar to that of the file list 2000 shown in FIG. 10. Similar to the main process for backup, a file list 2000 for restore has a file name 2001 and a confirmation bit 2002. In the main process for restore, a confirmation bit "0" indicates "still not restored" and a confirmation bit "1" indicates "already restored". A user may select particular files from the file list 2000 and a list of selected files may be used as the file list 2000. The backup control module 220 selects a file from the file list and reads it from the tape (1902). The backup control module 220 transfers the read file to the agent module 141 via LAN 300.

The agent module 141 writes in the file unit the transferred file in the restore volume via the FS module 145. After the file is written by the agent module 141 of NAS 100, the backup control unit 220 sets the confirmation bit 2002 of the file list 2000 corresponding to the restored file to "1" indicating "already restored" (1905). It is judged from the confirmation bit 2002 of the file list 2000 whether all restore files have already been restored (1906). If there is still a restore file, the flow returns to Step 1902. If all restore files in the file list 2000 have already been restored, i.e., if all the confirmation bits 2002 are "1", the main process for restore is terminated.

Next, the completion process 1104 will be described with reference to FIG. 11. In the completion process, the agent module 141 calls a completion script to be later described from the command module 142 (2101). It is judged whether the completion script terminates normally (2102). If it terminates normally, the completion process is terminated, whereas if it terminates abnormally, an error is returned to stop the completion process (2103).

The details of completion script execution will be described with reference to FIG. 12. First, the FS module 145 unmounts the file system of the secondary volume (2201). The volume label of the secondary volume is deleted in order for an OS not to erroneously recognize the secondary volume (2202). If the main process is for restore, the mirror control module 144 creates a copy of the primary volume 120 on the secondary volume 130 (2204). After the copy, the copy operation is stopped and the mirror control module 144 stores succeeding update data in another area (2205).

If the main process is for backup, the resynchronization process is executed (2206) to reflect the update difference in the primary volume 120 during the backup process upon the secondary volume.

NAS resumes the normal operation using the primary volume 120 and secondary volume 130.

2. Second Embodiment

Figure 13:
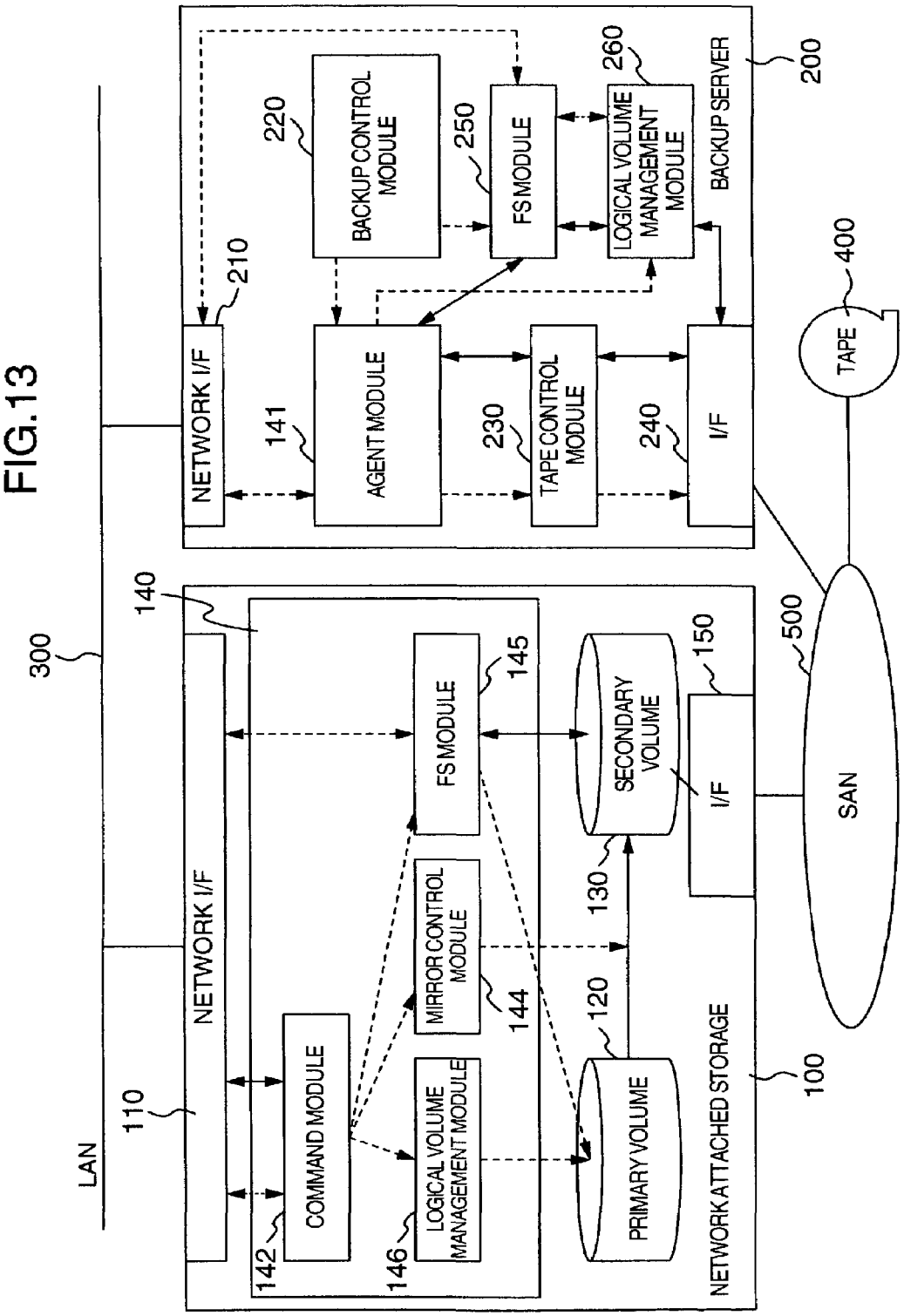
FIG. 13 is a diagram showing the structure of a computer system according to second and third embodiments of the invention.

In the second embodiment, only different points from the first embodiment will be described. FIG. 13 shows the structure of the backup system.

In the backup system of the second embodiment, a storage area network (SAN) 500 such as Fibre Channel is provided between a network attached storage (NAS) 100 and a backup server 200 to make NAS 100 pass file information (meta data and the like) to the backup server 200. The backup server refers to the data blocks of a file and backs up the file on a tape. In restoring backup data, the backup server writes in the file unit the data in the volume of NAS 100 via SAN 500.

In the second embodiment, the agent module 141 in NAS 100 shown in FIG. 1 (first embodiment) is provided in the backup server 200. An agent module 141 controls a command module 142 of NAS 100 via LAN 300. The backup server 200 has an FS module 250 capable of sharing the file system of NAS 100 in order to access a file, and the agent module 141 capable of creating a secondary volume 130 and backing up a file by using the file system.

SAN 500 is provided so that the backup server 200 can recognize the secondary volume 130 of NAS 100. In this embodiment, although Fibre Channel is used as SAN 500, other communication paths capable of transferring data such as SCSI and Ethernet may also be used. Connected to this SAN 500 are an I/O interface (I/F) 150 of NAS 100 and an I/O I/F 240 of the backup server 200. A magnetic tape apparatus 400 is connected to SAN 500. The backup server 200 has a logical volume management module 260 to judge the volume structure of the secondary volume 130, and recognizes the volume.

Similar to the first embodiment, the second embodiment also has an initializing process 1102, a main process 1103 and a completion process 1104 such as shown in FIG. 2. The operations of these three processes will be described specifically.

The initializing process 1102 will be described with reference to FIG. 4. The initializing process is fundamentally the same as that of the first embodiment. In the second embodiment, the agent module 141 of the backup server 200 activates a script representing the operation of the command module 142 via LAN 300, and judges the operation from a return value. Since the agent module 141 exists in the backup server as shown in FIG. 13, in the volume recognition at Step 1404 shown in FIG. 4, the logical volume management module 260 in the backup server recognizes the secondary volume 130 as another volume.

Figure 4:
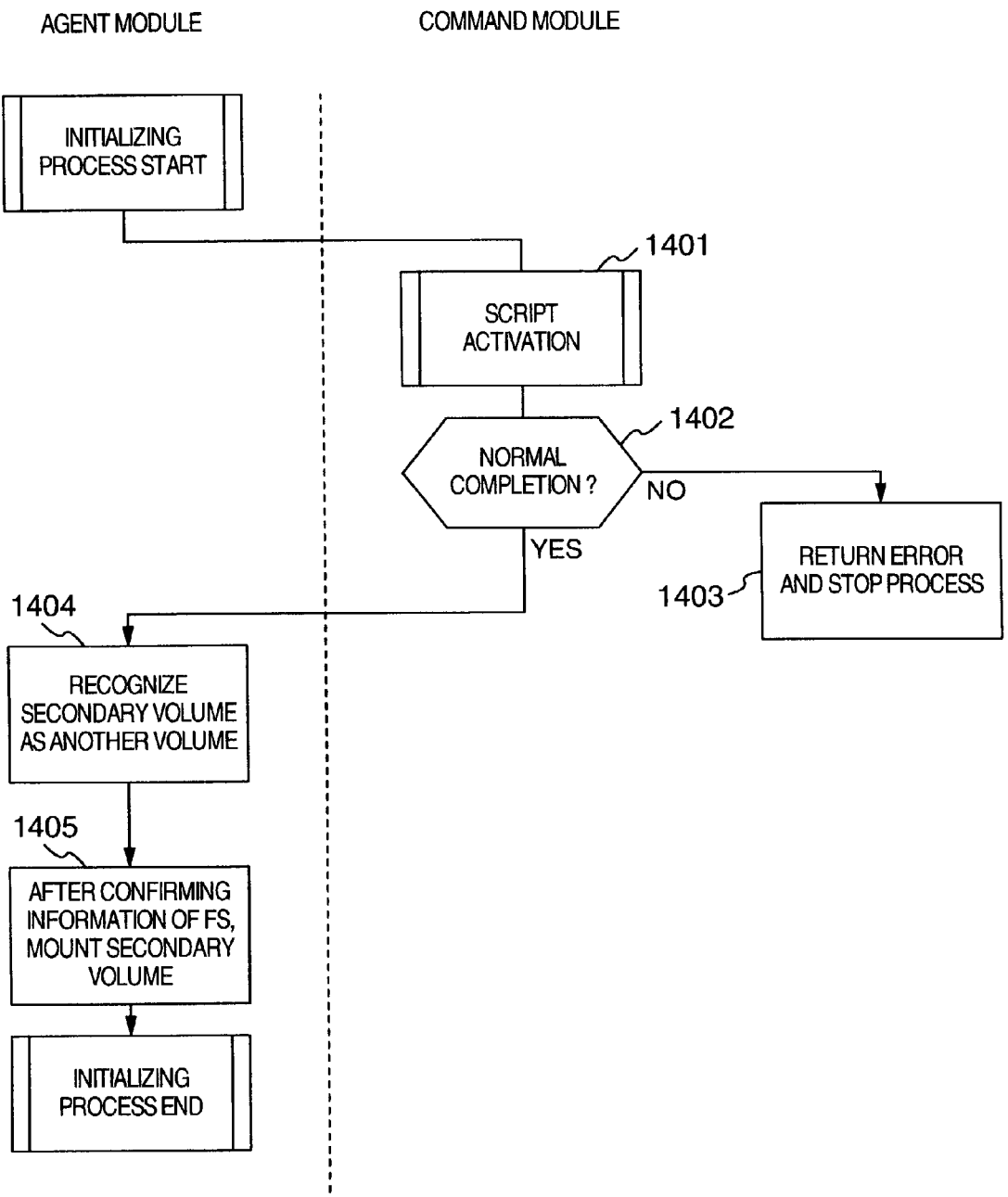
FIG. 4 is a flow chart illustrating processes to be executed by the agent module 141 and a command module 142 during an initializing process according to the first embodiment.
Figure 19:
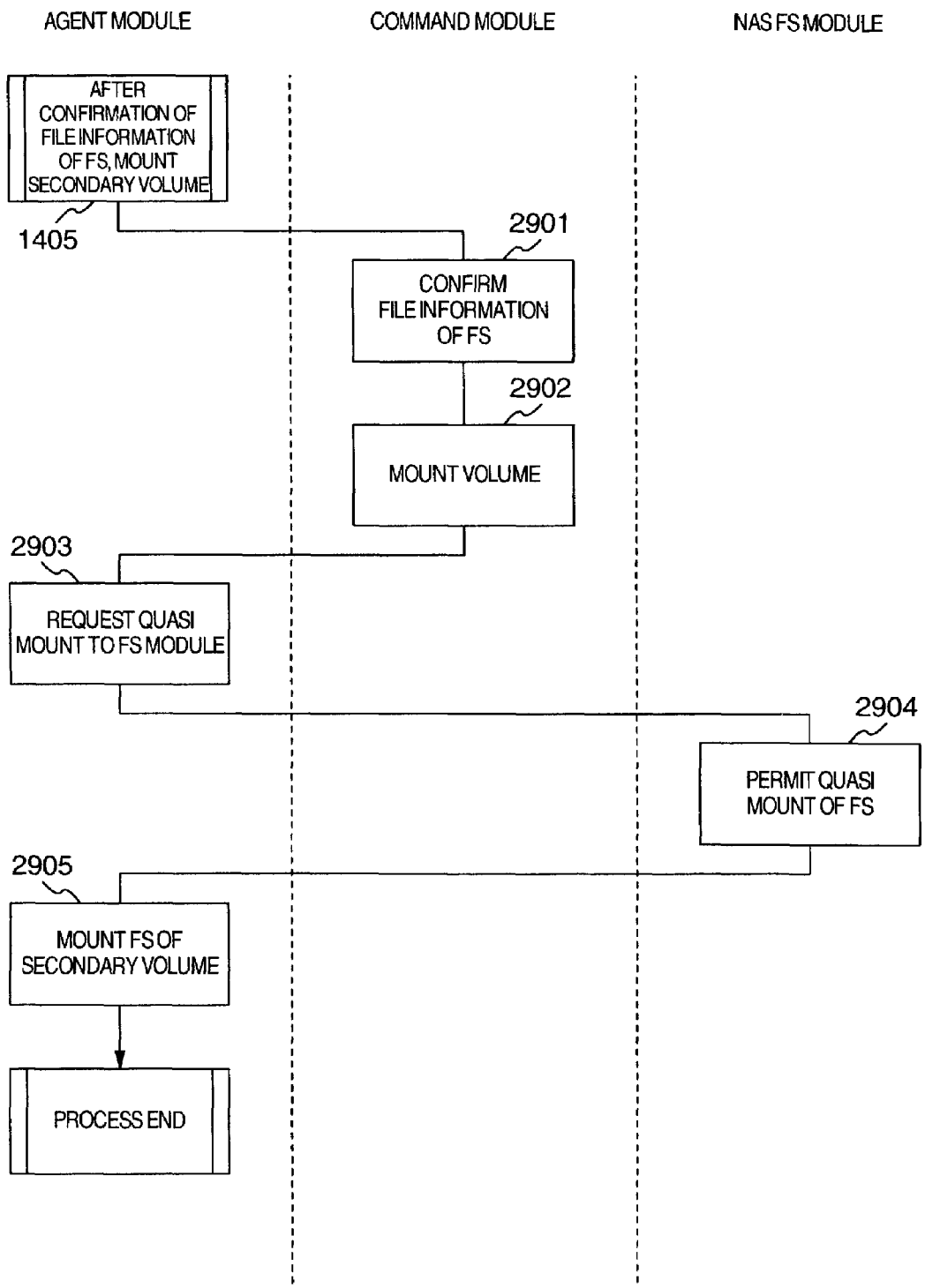
FIG. 19 is a flow chart illustrating an operation of mounting a secondary volume after file information of FS is confirmed, according to the second embodiment.

As shown in FIG. 19, when the secondary volume 130 is mounted at Step 1405 shown in FIG. 4, consistency of the file information of the file system in the secondary volume 130 of NAS 100 is checked by utilizing a file consistency check tool such as "fsck" (2901), and NAS 100 mounts the volume (2902). Management of the file system can therefore be performed collectively by NAS 100.

Thereafter, the backup server 200 requests a quasi mount of the secondary volume 130 to NAS 100 (2903). When the FS module 145 of NAS 100 permits the quasi mount (2904), the secondary volume 130 is mounted in the backup server (2905). With this quasi mount, the backup server 200 can operate the file in the secondary volume of NAS 100 by utilizing an open, access and close functions to be described later, without involvement of the FS module 145 of NAS 100, which operates for the primary volume 120.

The operation of script activation is the same as that of the first embodiment. Creating a snapshot and a restore volume is the same as that of the first embodiment.

Next, the main process 1103 will be described. The operation of the main process is different between backup and restore. The main process for backup will be described with reference to FIG. 8. Although the fundamental operation is similar to that of the first embodiment, the backup server 200 can access a data block of the file. Therefore, a different file list acquiring process is executed for a file operation, i.e., file open, access and backup. Although this process will be later described, different operations of the main process for backup shown in FIG. 8 include an operation of creating a file list of the secondary volume 130 at Step 1802 and an operation of opening a file in the secondary volume via the FS module 250 of the backup server 200 at Step 1805, reading and closing the file. The file operation is different also for the main process for restore. Namely, operations of the second embodiment different from the first embodiment include an operation of acquiring a file list 2000 at Step 1901 shown in FIG. 9 and an operation of opening, writing and closing a file for writing the file in the secondary volume 130 as the restore volume at Step 1904.

The operation of file opening, file access and file list acquisition will be described. In a general file access via a file system, (1) a file is opened to acquire a file descriptor, (2) by referring to the file descriptor, real data of the file is read or an access for write is executed, and (3) after the subject access is completed, the file is closed by referring to the file descriptor. These three processes are executed. In the first embodiment, these three processes are executed by the FS module 145.

In the second embodiment, the backup server 200 refers to the volume in NAS 100. To refer to the volume, the three processes are therefore executed by the backup server 200 and the file information of NAS 100 can be referred to via LAN 300. A file is constituted of meta data storing a file name, file attribute information and the like, and an actual data storage field storing actual data. Meta data of file information is exchanged via LAN 300 and actual data access is performed by SAN 500 to separate file control and data access and configure the system suitable for data access tendency.

Figure 14:
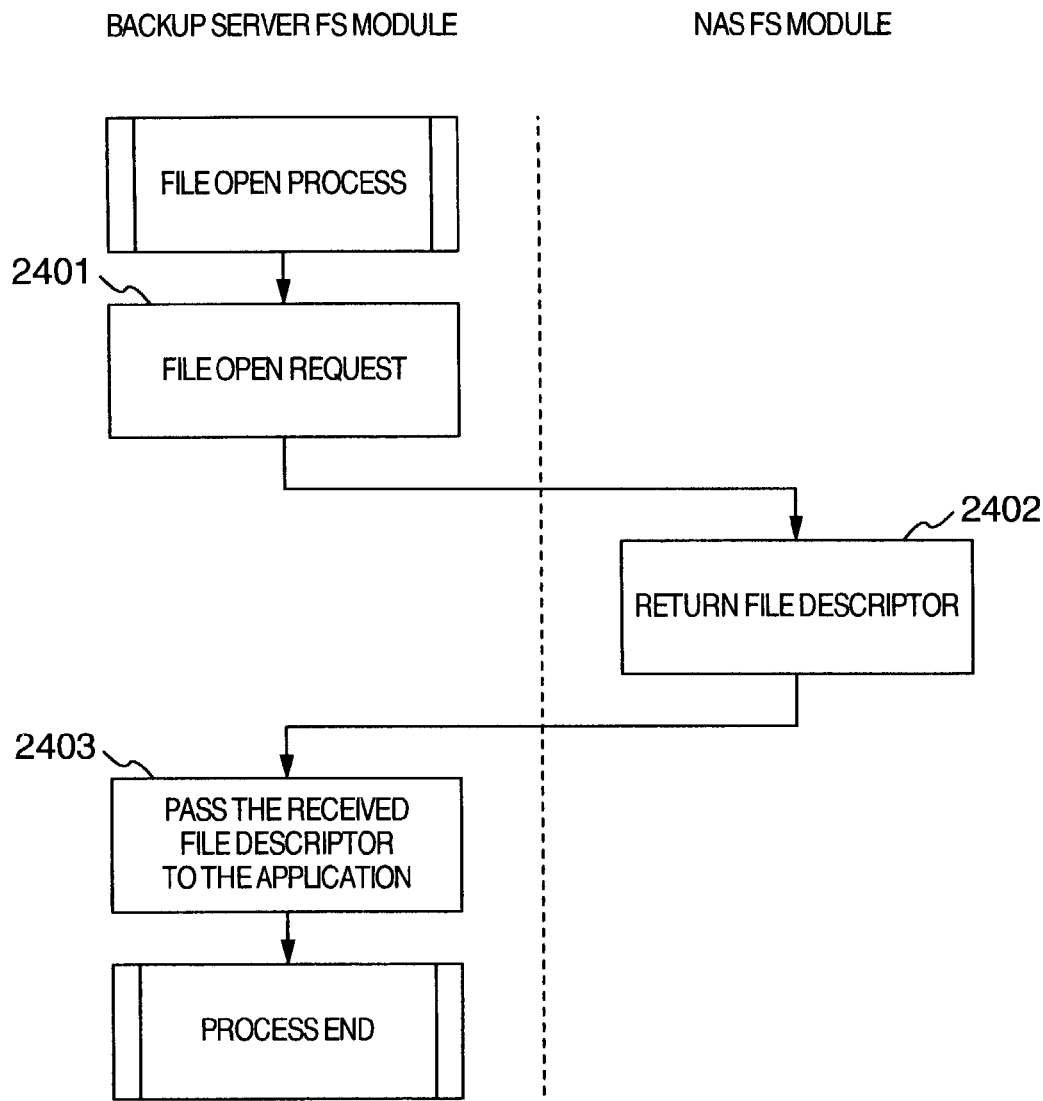
FIG. 14 is a flow chart illustrating an open process according to the second embodiment.

A file open process will be described with reference to FIG. 14. Upon reception of an open command, the FS module 250 of the backup server 200 issues a file open request to NAS 100 (2401). If the file exists, the FS module 145 of NAS 100 returns the file descriptor to the backup server 300 (2402). If the file does not exist, the file information may be created from designation made at the time of the file open. If there is no designation, it is regarded as an error. The backup server 300 passes the received descriptor to the application or the like which designated a file open (2403).

Figure 15:
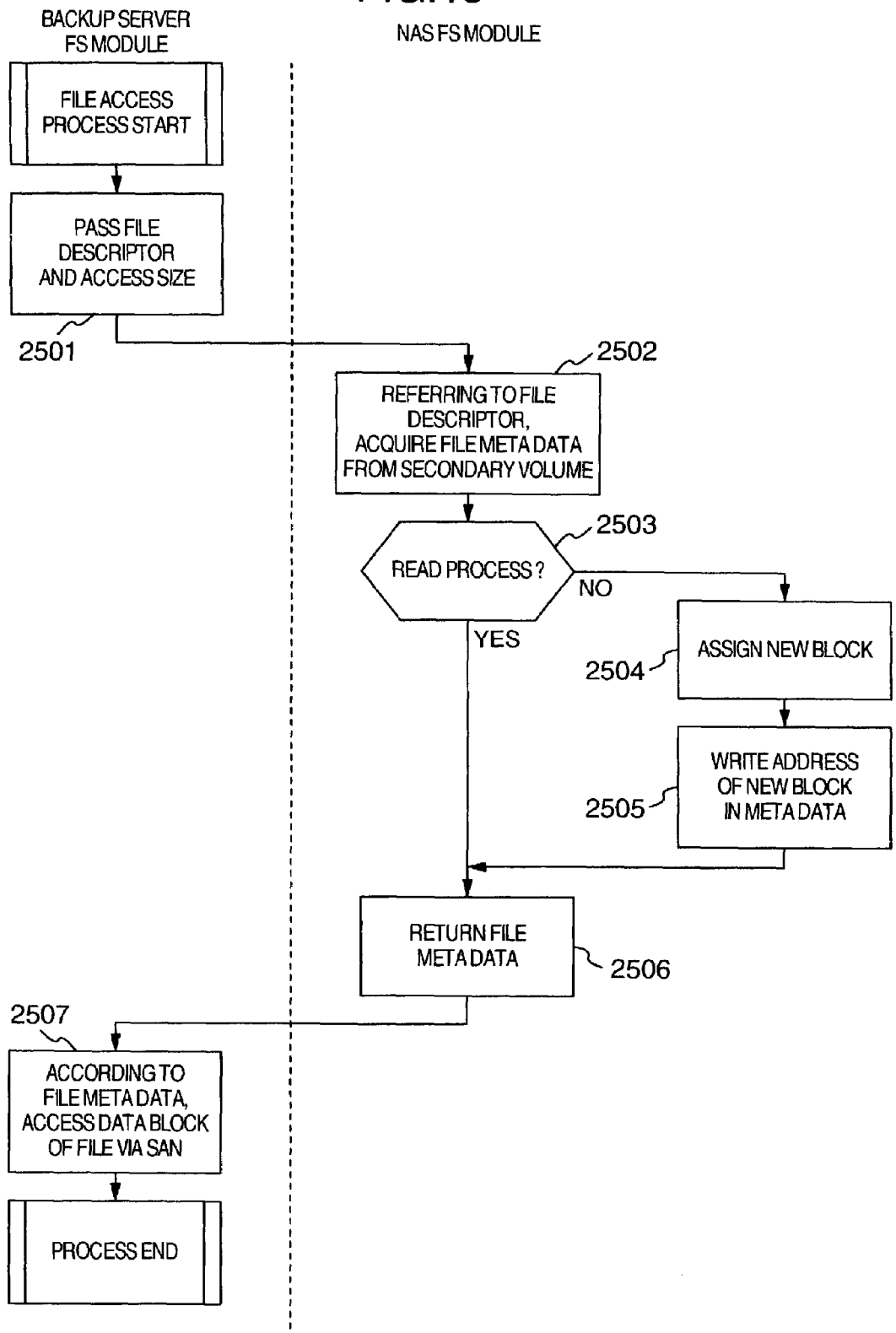
FIG. 15 is a flow chart illustrating a file access process according to the second embodiment.

Next, a file access process for file read/write will be described with reference to FIG. 15. In order to designate a particular file, the backup server 200 passes the file descriptor and an access size (byte unit) to the FS module 145 of NAS 100 (2501). In accordance with the file descriptor, the FS module 145 acquires meta data of the file from the secondary volume 130 (2502). As shown in FIG. 18, this meta data 2800 is constituted of an owner 2810, the number 2820 of file hard links, a file size 2830, a data block address LBA 2840, a last access time 2850 and a last update time 2860. If the file access process is for data write (2503), the FS module 145 of NAS 100 assigns a new data block for storing data (2504) and writes LBA of the new block in the meta data 2800 (2505). The FS module 145 of NAS 100 returns the meta data 2800 of the file to the FS module 250 of the backup server 200 (2506). By referring to the address 2840 of the meta data 2800 indicating the file data LBA, the FS module 250 of the backup server 200 accesses the volume via SAN 500 (2507). In the second embodiment, the secondary volume 130 is referred to via SAN 500.

Figure 16:
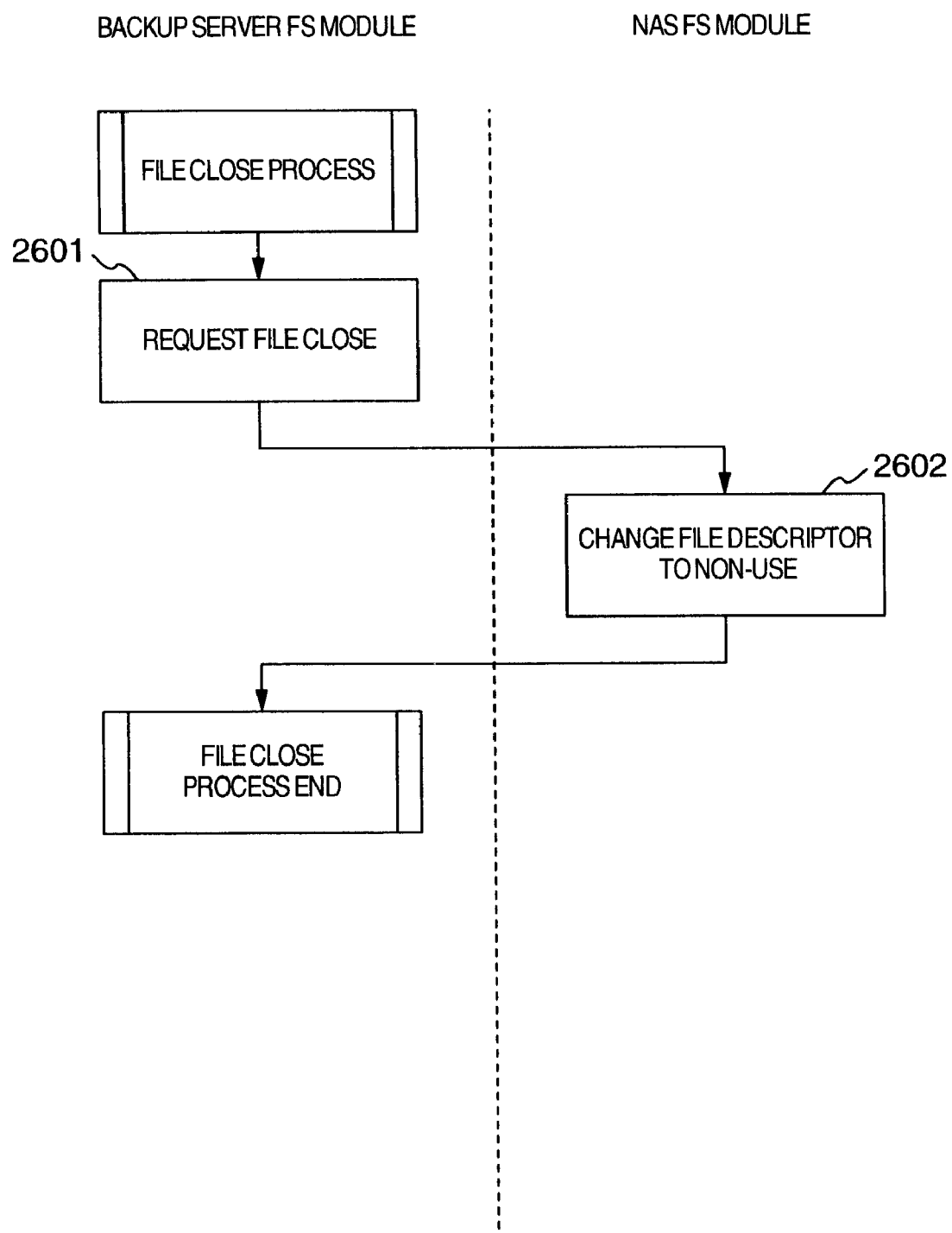
FIG. 16 is a flow chart illustrating a close process according to the second embodiment.

Next, with reference to FIG. 16, the close process will be described. First, the FS module 250 of the backup server 200 passes a file close request along with the file descriptor to the FS module 145 of NAS 100 (2601). The FS module 145 of NAS 100 manages the file descriptor of the file as non-use (2602). The result of the close process is returned to the FS module 250 of the backup server 200 to terminate the process.

In addition to the file operation described above, it is necessary to output a file name for designating a file in the file system. The FS module 250 of this embodiment has a command of listing files in a directory similar to a general file system in response to the file request from the backup control module 220. For example, this command is "ls" or "dir" in a general OS. If a directory has another directory, it is possible to designate the other directory and refer to data in a file. The file system of this embodiment is a general hierarchical file system, i.e., the file system has a top directory which has files or directories. When a file list of files in the secondary volume 130 is to be created, a list of file names stored in the file name 2001 shown in FIG. 10 may be created by referring to the file names in the file system by using a file listing command.

The completion process of the second embodiment is the same as that of the first embodiment.

The details of a completion script will be given with reference to FIG. 12. Although the fundamental operation is the same as that of the first embodiment, the FS module shown in FIG. 12 corresponds to both the FS module 145 of NAS 100 and the FS module 250 of the backup server 200. Therefore, unmounting at Step 2201 corresponds to both unmounting the secondary volume in NAS 100 and unmounting the quasi-mounted secondary volume in the backup server 200. This completion script operates in the backup server 200 and controls the FS module 145 and mirror control module 144 of NAS 100 via LAN 300.

3. Third Embodiment

In the backup system of the third embodiment, a storage area network (SAN) such as Fibre Channel is provided between a network attached storage (NAS) 100 and a backup server 200, a replica of a primary volume 120 including the file system under management of NAS 100 is provided as a secondary volume, and the backup server refers to the data blocks of the file system in the secondary volume to back up a file in a tape. In restoring backup data, the backup server 200 writes in the file unit the data in the secondary volume 130 of NAS 100 via SAN 500.

This system is configured basing upon the system of the second embodiment shown in FIG. 13. Different points from the second embodiment will be described.

In the second embodiment, the FS module 145 of NAS 100 communicates with the FS module 250 of the backup server 200 so that the backup server can refer to the file system in the volume of NAS 100. In the third embodiment, the FS module 250 of the backup server 200 can understand the file system recorded in the volume of NAS 100 so that the control lines (broken lines) between the FS module 145 and network I/F 110 and between the FS module 250 and network I/F 210 are not necessary.

Although the fundamental operation of the third embodiment is similar to that of the second embodiment, the backup server 200 refers directly to the file system in the secondary volume 130 via SAN 500 so that some operations are different from the second embodiment. The operation of the third embodiment will be described in connection with the operation of the second embodiment.

In the system of the invention, the backup server 200 calls NAS 100 to perform the backup or restore operation. FIG. 2 illustrates this operation. In this embodiment, the backup control module 220 and agent module 141 operate in the backup server 200. The operation thereof is the same as the second embodiment illustrated in FIG. 2.

Figure 20:
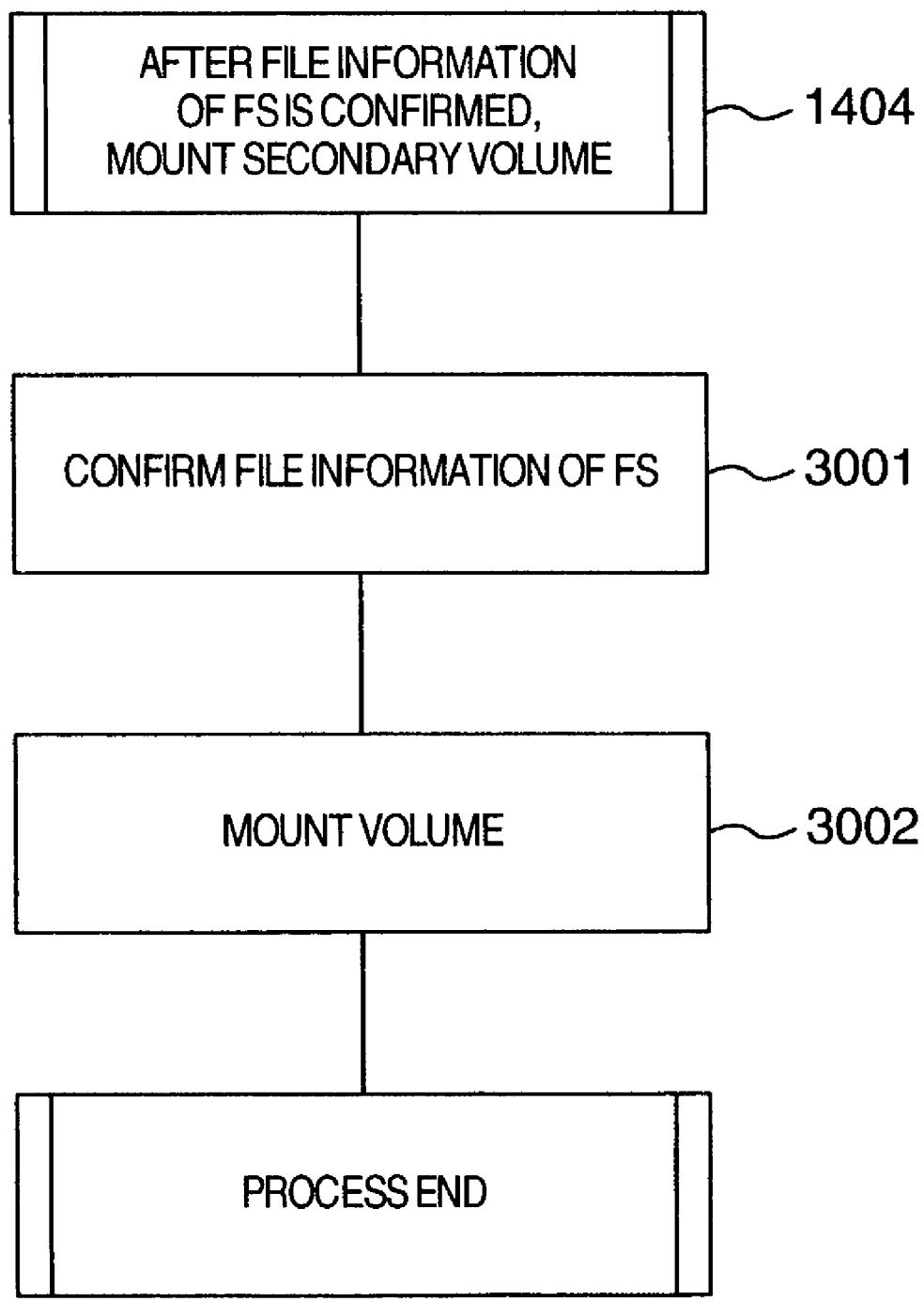
FIG. 20 is a flow chart illustrating an operation of mounting a secondary volume after file information of FS is confirmed, according to a third embodiment of the invention.

Similar to the second embodiment, the third embodiment performs the initializing process 1102, main process 1103 and completion process 1104. Specific operations of these three processes will be described. First, the initializing process 1102 will be described. Although the fundamental operation is the same as that of the second embodiment illustrated in FIG. 4, an operation of mounting the secondary volume 130 at Step 1405 is different. This operation is illustrated in FIG. 20. The agent module 141 confirms consistency of the file information of the file system in the secondary volume 130 by utilizing a file consistency check tool such as "fsck" (3001), and mounts the volume (3002).

Figure 5:
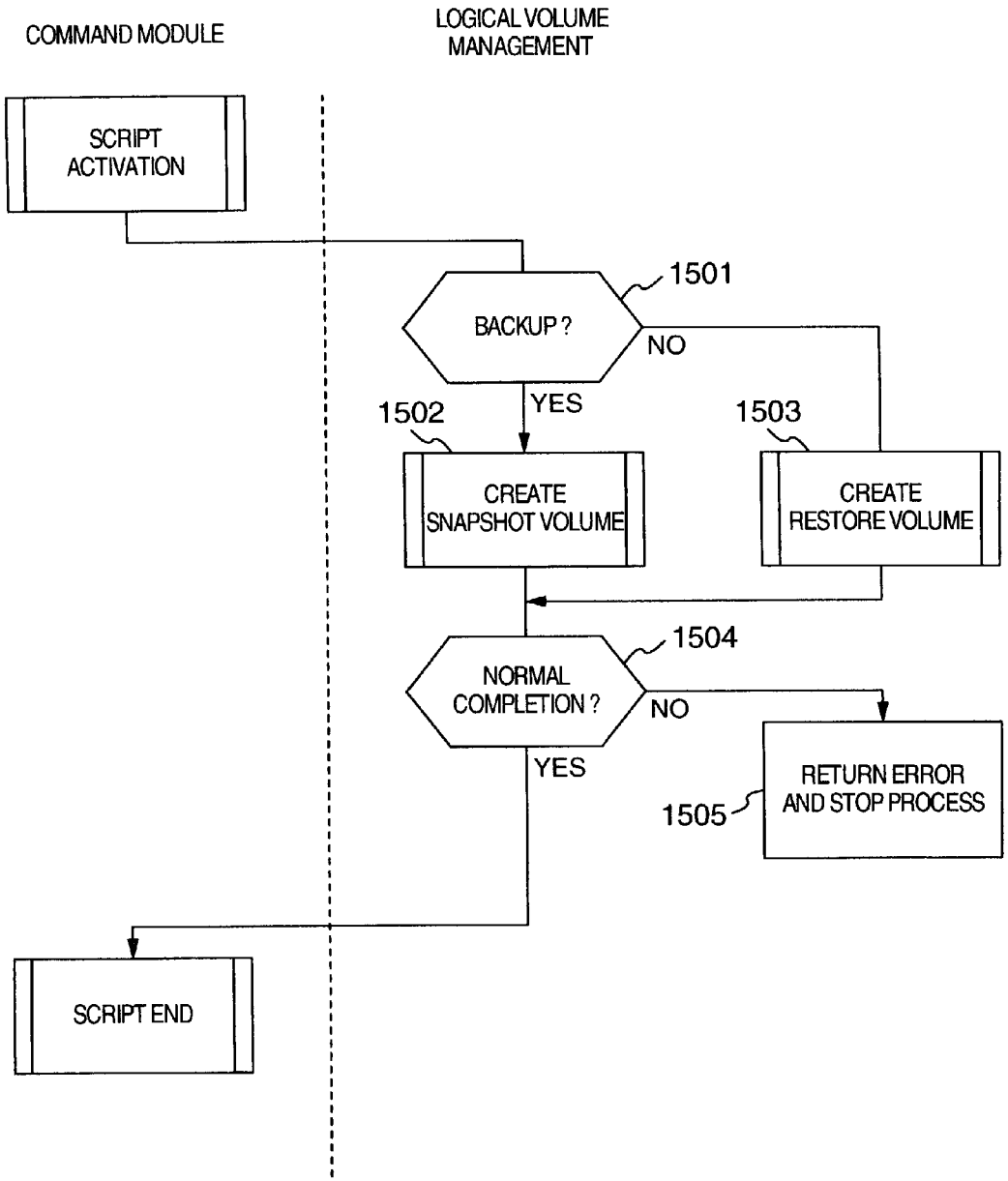
FIG. 5 is a flow chart illustrating processes to be executed by the command module 142 and a logical volume management module 146 during a script process according to the first embodiment.
Figure 6:
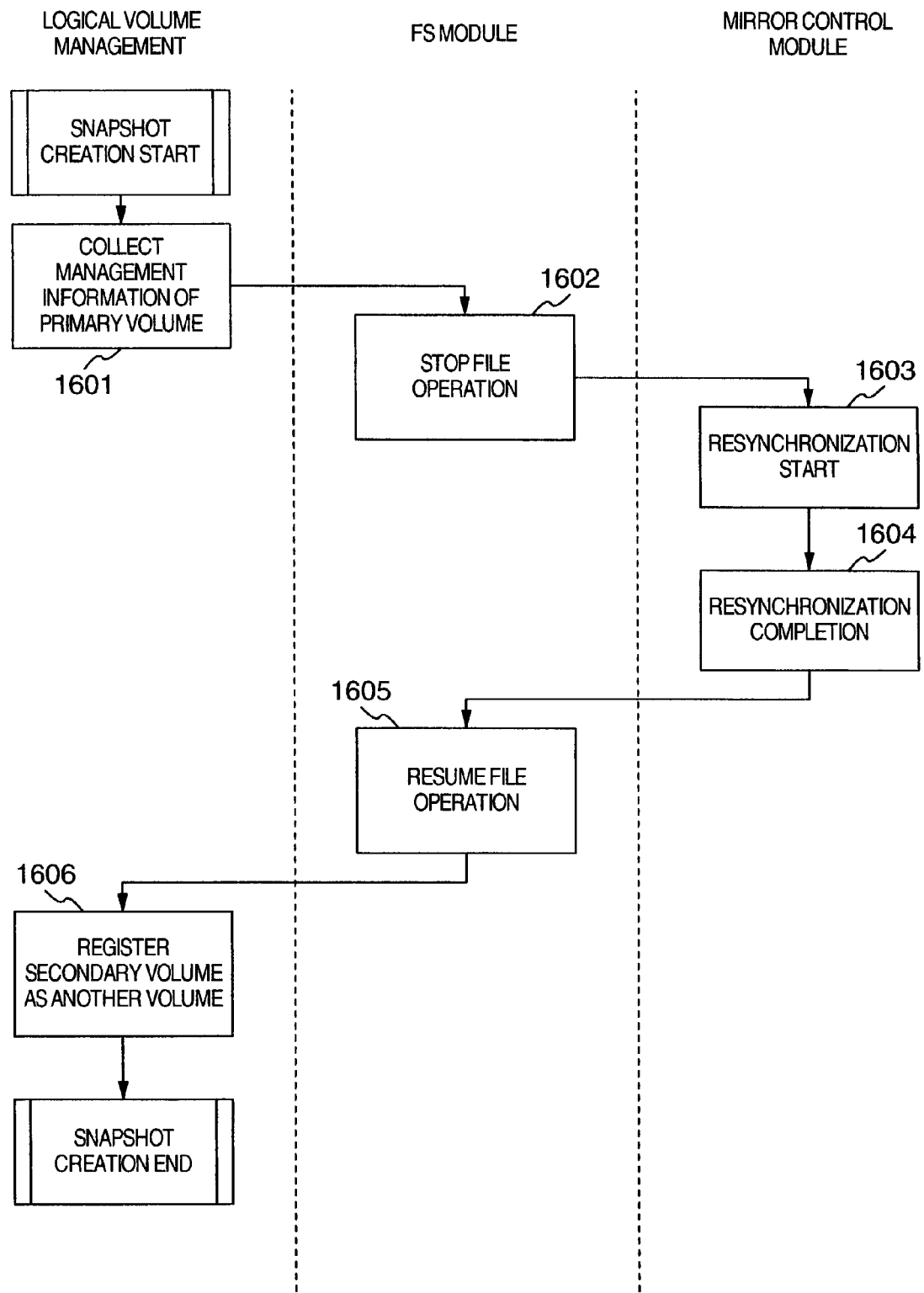
FIG. 6 is a flow chart illustrating processes to be executed by the logical volume management module 146, a file system (FS) module 145 and a mirror control module 144 during a snap shot volume forming process according to the first embodiment.

An operation (1502) of creating a snapshot during script activation shown in FIG. 5 is illustrated in FIG. 6. This operation of the third embodiment is the same as that of the second embodiment. Creating a restore volume (1503) is illustrated in FIG. 7. This operation is the same as that of the second embodiment.

Next, the main process 1103 will be described. The contents of the main process are different between backup and restore. First, the main process for backup will be described with reference to FIG. 8. The fundamental operation is the same as the second embodiment illustrated in FIG. 8. In the third embodiment, the FS module 250 of the backup server 200 can understand the file system so that the backup server can directly access the data blocks of a file. The FS module 250 has therefore a function of understanding the file system of the secondary volume 130 in NAS 100. Namely, the file open, access and close are performed directly to the file system of the secondary volume. These three processes are performed by the FS module 250. The main process for restore is the same as that of the second embodiment illustrated in FIG. 9.

Figure 11:
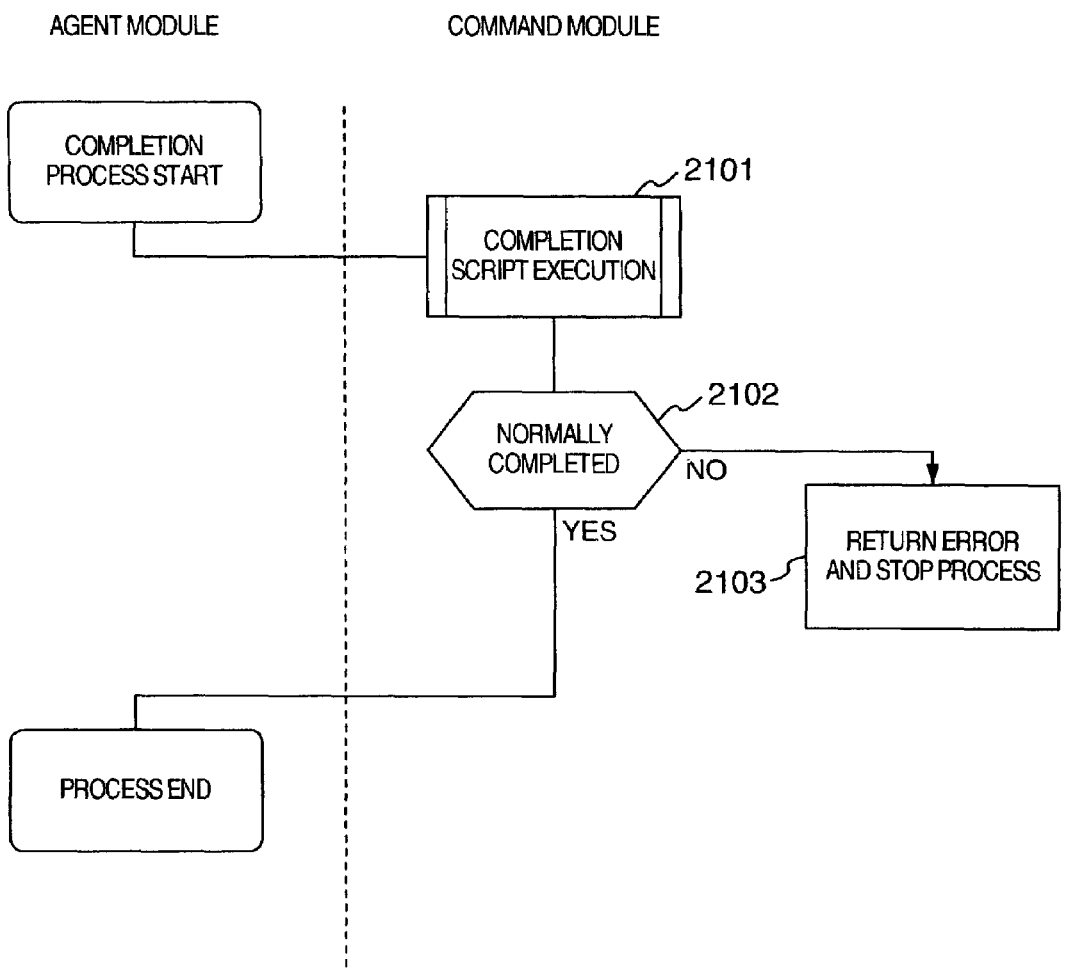
FIG. 11 is a flow chart illustrating processes to be executed by the agent module 141 and command module 142 during a completion process according to the first embodiment.

The completion process of the third embodiment is the same as that of the second embodiment shown in FIG. 11.

Figure 12:
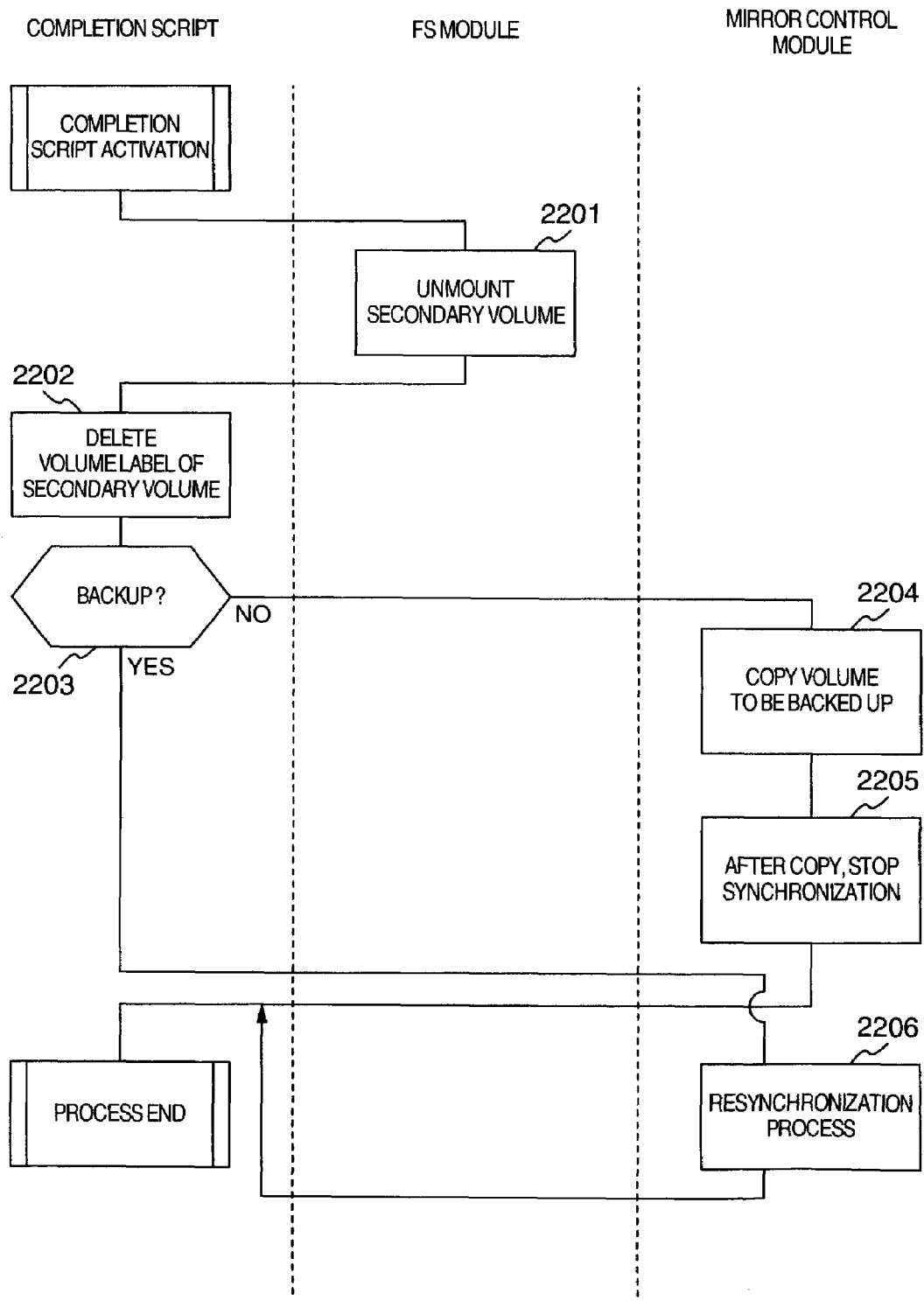
FIG. 12 is a flow chart illustrating processes to be executed by the FS module 145 and mirror control module 144 during a completion script process according to the first embodiment.

Although the fundamental operation of the completion script is the same as that of the second embodiment illustrated in FIG. 12, the FS module shown in FIG. 12 corresponds to the FS module 250 of the backup server 200 in the third embodiment. Unmounting the secondary volume at Step 2201 in FIG. 12 corresponds to unmounting the secondary volume 130 mounted by the backup server 200. This completion script runs on the backup server 200 and the FS module 145 and mirror control module 144 of NAS 100 are controlled via LAN 300.

It should be further understood by those skilled in the art that the foregoing description has been made on embodiments of the invention and that various changes and modifications may be made in the invention without departing from the spirit of the invention and the scope of the appended claims.

What is claimed is:

1. A backup system comprising:
   a network attached storage including a primary volume and a secondary volume; and
   a backup server connected to the network, which accepts inputs of a backup request or a restore request, along with at least one identifier of backup/restore target from an operator,
   wherein:
   said network attached storage comprises:
      resynchronization means for performing a resynchronization process when the backup request is received at a time point that consistency of a file system can be guaranteed, the resynchronization process making the contents of the primary and secondary volumes coincide with each other;
      data transferring means for splitting the secondary volume from the primary volume and transferring data identified with the backup target identifier of the secondary volume to said backup server; and
      agent means for communicating with the backup server to receive therefrom a file list request with the identifier of backup/restore target and for controlling the resynchronization means and the data transferring means, the agent means configured to send a file list to the backup server in response to receiving the file list request from the backup server, the file list including identifiers of files stored on the secondary volume and information for each file indicating whether or not said each file has been backed up,
   wherein the backup server sends backup operation commands to the agent means, based on files identified in the file list, in order to perform a backup operation of the files stored in the secondary volume.

2. A backup system according to claim 1, wherein said network attached storage further comprises means for performing again the resynchronization process for making the contents of the primary and secondary volumes coincide with each other, after backup completion.

3. A backup system according to claim 1, wherein said data transferring means of said network attached storage transfers data in the unit of file.

4. A backup system according to claim 1, wherein said network attached storage further comprises:
   splitting means responsive to reception of the restore request for splitting the secondary volume from the primary volume and changing the secondary volume to a restore volume;
   first restore data transmitting means for receiving restore data from said backup server and transferring the restore data to the restore volume; and
   second restore data transmitting means responsive to the restore request for transmitting the restore data in the restore volume, wherein the agent means receives the restore request with the identifier of restore target from the backup server and controls the splitting means, the first restore data transmitting means, and the second restore date transmitting means.

5. A backup system according to claim 4, wherein said network attached storage further comprises means for changing the restore volume to the secondary volume after restore completion and copying the contents of the primary volume to the secondary volume.

6. A backup method for a system including a network attached storage including a primary volume and a secondary volume, and a backup server connected to the network, the backup method comprising:

in the backup server, a step of accepting inputs of a backup request with at least one backup target identifier from an operator and sending the backup request to the network attached storage;

in the network attached storage, a step of performing a resynchronization process when the backup request is received at a point that consistency of a file system can be guaranteed, the resynchronization process making the contents of the primary and secondary volumes coincide with each other;

in the network attached storage, a step of splitting the secondary volume from the primary volume and transferring data identified with the backup target identifier of the secondary volume to the backup server while an on-line operation with the primary volume continues;

in the backup server, a step of requesting a file list from the network attached storage, the file list including identifiers of file stored in the secondary volume and information for each file, whether said each file has been backed up or not;

in the backup server, a step of sending backup operation commands to the network attached storage to backup files stored in the secondary volume in accordance with the file list;

in the backup server, a step of storing the transferred data in a recording medium; and in the network attached storage, a step of performing again the resynchronization process for making the contents of the primary and secondary volumes coincide with each other, after backup completion.

7. A restore method for a system including a network attached storage including a primary volume and a secondary volume, and a backup server connected to the network, the restore method comprising:

in the backup server, a step of accepting inputs of a restore request with at least one restore target identifier from an operator and sending the restore request to the network attached storage;

in the network attached storage, a step of splitting the secondary volume from the primary volume and changing the secondary volume to a restore volume, in response to reception of a restore request;

in the backup server, a step of reading data from a recording medium and transmitting restore data identified with the restore target identifier to the network attached storage;

in the network attached storage, a step of receiving the restore data from the backup server and transferring the restore data to the restore volume;

a step of transmitting the restore data in the restore volume in response to the restore request; and a step of changing the restore volume to the secondary volume after restore completion and copying the contents of the primary volume to the secondary volume.

8. A network attached storage comprising:

agent means for communicating with a backup server to receive a backup/request with at least one identifier of a backup target;

first resynchronization means for performing a resynchronization process when the backup request is received at a time point that consistency of a file system can be guaranteed, the resynchronization process making the contents of a primary volume and a secondary volume coincide with each other;

splitting means for splitting the secondary volume from the primary volume and transferring data of the secondary volume to the network; and second resynchronization means for performing again the resynchronization process for making the contents of the primary and secondary volumes coincide with each other, after backup completion, wherein the agent means controls the first resynchronization means, splitting means, and second resynchronization means, the agent means configured to send a file list to the backup server in response to receiving a file list request from the backup server, the file list including identifiers of files stored on the secondary volume and information for each file indicating whether or not said each file has been backed up, wherein the agent means is further configured to receive backup operation commands from the backup server to perform a backup operation of the files stored in the secondary volume, the backup operation commands being based on files identified in the file list.

9. A backup system comprising:

a network attached storage including a primary volume and a secondary volume; and a backup server connected to the first network, wherein:

the secondary volume and said backup server are connected to a second network;

said network attached storage comprises:

means for performing a resynchronization process when a backup request is received at a time point that consistency of a file system can be guaranteed, the resynchronization process making the contents of the primary and secondary volumes coincide with each other;

means for splitting the secondary volume from the primary volume; and means for performing again the resynchronization process for making the contents of the primary and secondary volumes coincide with each other, after backup completion, and said backup server comprises:

means for accepting inputs of backup request with at least one identifier of a backup target from an operator;

volume connecting means responsive to the backup request for connecting the secondary volume;

reading means for reading backup data identified with the backup target identifier from the secondary volume via the second network to store the read data in a recording medium; and agent means for communicating with the network attached storage via the first network for controlling the network attached storage, in response to the backup request, and for controlling the volume connecting means and the reading means.

10. A backup system according to claim 9, wherein the second network is a storage area network (SAN).

* * * * *